United States Patent
Das et al.

(10) Patent No.: US 11,551,084 B2
(45) Date of Patent: Jan. 10, 2023

(54) SYSTEM AND METHOD OF ROBUST ACTIVE LEARNING METHOD USING NOISY LABELS AND DOMAIN ADAPTATION

(71) Applicant: Robert Bosch GmbH, Stuttgart (DE)

(72) Inventors: Rajshekhar Das, Pittsburgh, PA (US); Filipe J. Cabrita Condessa, Pittsburgh, PA (US); Jeremy Zieg Kolter, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 584 days.

(21) Appl. No.: 16/724,109

(22) Filed: Dec. 20, 2019

(65) Prior Publication Data

US 2021/0192335 A1   Jun. 24, 2021

(51) Int. Cl.
  *G06N 20/00*   (2019.01)
  *G06N 3/08*    (2006.01)
  *G06N 3/04*    (2006.01)
  *G06F 9/48*    (2006.01)

(52) U.S. Cl.
  CPC ............. *G06N 3/08* (2013.01); *G06F 9/4881* (2013.01); *G06N 3/0454* (2013.01); *G06N 20/00* (2019.01)

(58) Field of Classification Search
  CPC .................................................. G06N 20/00
  See application file for complete search history.

(56) References Cited

U.S. PATENT DOCUMENTS

| | | | |
|---|---|---|---|
| 10,402,701 B2 | 9/2019 | Sohn et al. | |
| 2016/0253597 A1* | 9/2016 | Bhatt | G06N 20/00 706/12 |
| 2018/0218284 A1 | 8/2018 | Jawahar et al. | |
| 2019/0287515 A1* | 9/2019 | Li | G10L 15/063 |

FOREIGN PATENT DOCUMENTS

WO   2018109505 A1   6/2018

OTHER PUBLICATIONS

B. Settles, "Active Learning Literature Survey," Technical Report #1648, Univ. of Wisconsin at Madison, Jan. 2009 (Year: 2009).*
H, Wang, "A Direct Approach to Robust Deep Learning Using Adversarial Networks," Conference Paper, ICLR, May 23, 2019 (Year :2019).*
S. Reed, "Training Deep Neural Networks on Noisy Labels with Bootstrapping," arXiv:1412.6596v3, ICLR, Apr. 15, 2015 (Year: 2015).*
D. Lowell, "Practical Obstacles to Deploying Active Learning," arXiv:1807.04801, Nov. 1, 2019 (Year: 2019).*
Sukhbaatar et al., "Training Convolutional Networks With Noisy Labels", ICLR 2015, 11 pages.
Su et al., "Active Adversarial Domain Adaptation", Mar. 9, 2020, 12 pages.
Ganin et al., "Domain-Adversarial Training of Neural Networks", May 26, 2016, 35 pages.

\* cited by examiner

*Primary Examiner* — Eric J Yoon
(74) *Attorney, Agent, or Firm* — Brooks Kushman P.C.

(57) ABSTRACT

A system and method is disclosed for labeling an unlabeled dataset, with a labeling budget constraint and noisy oracles (i.e. noisy labels provided by annotator), using a noisy labeled dataset from another domain or application. The system and method combine active learning with noisy labels and active learning with domain adaptation to enhance classification performance.

18 Claims, 6 Drawing Sheets

SYSTEM AND METHOD OF ROBUST ACTIVE LEARNING METHOD USING NOISY LABELS AND DOMAIN ADAPTATION

TECHNICAL FIELD

The following relates generally to a system and method for robust active learning using noisy labels and domain adaptation.

BACKGROUND

Typically, labeling a dataset may involve a human annotator that manually assigns one or more labels to a sample according to a pre-defined set of allowed labels. Manually labeling a dataset in this manner may, however, require significant resources and time. Also, such manual labeling may diminish the performance of an automated machine learning system.

SUMMARY

A system and method is disclosed for an active learning algorithm that receives a noisily labeled source dataset. The system and method may apply a robust deep learning algorithm to identify a source classifier for the noisily labeled source dataset. The adapted classifier may be identified using an adversarial domain discrimination machine learning algorithm. The system and method may determine an adapted classifier using an adversarial machine learning algorithm (i.e., adversarial network) that operates on the source classifier. A label may be assigned to one or more samples within an unlabeled target dataset based on the active learning algorithm that operably uses a target classifier and the adapted classifier.

The system and method may also warm-start the active learning algorithm using the adapted classifier. The active learning algorithm may be operable to provide training data for the target classifier. A scheduler may also control a duration for warm-starting the active learning algorithm.

It is contemplated that the robust deep learning algorithm may include a softmax layer followed by a dense linear layer operable to perform denoising of the noisily labeled source dataset. The active learning algorithm may also be designed using a maximum entropy-based heuristic algorithm or a batch active learning algorithm. The target classifier may be updated per-batch when a batch active learning algorithm is applied.

DETAILED DESCRIPTION

Figure 1:
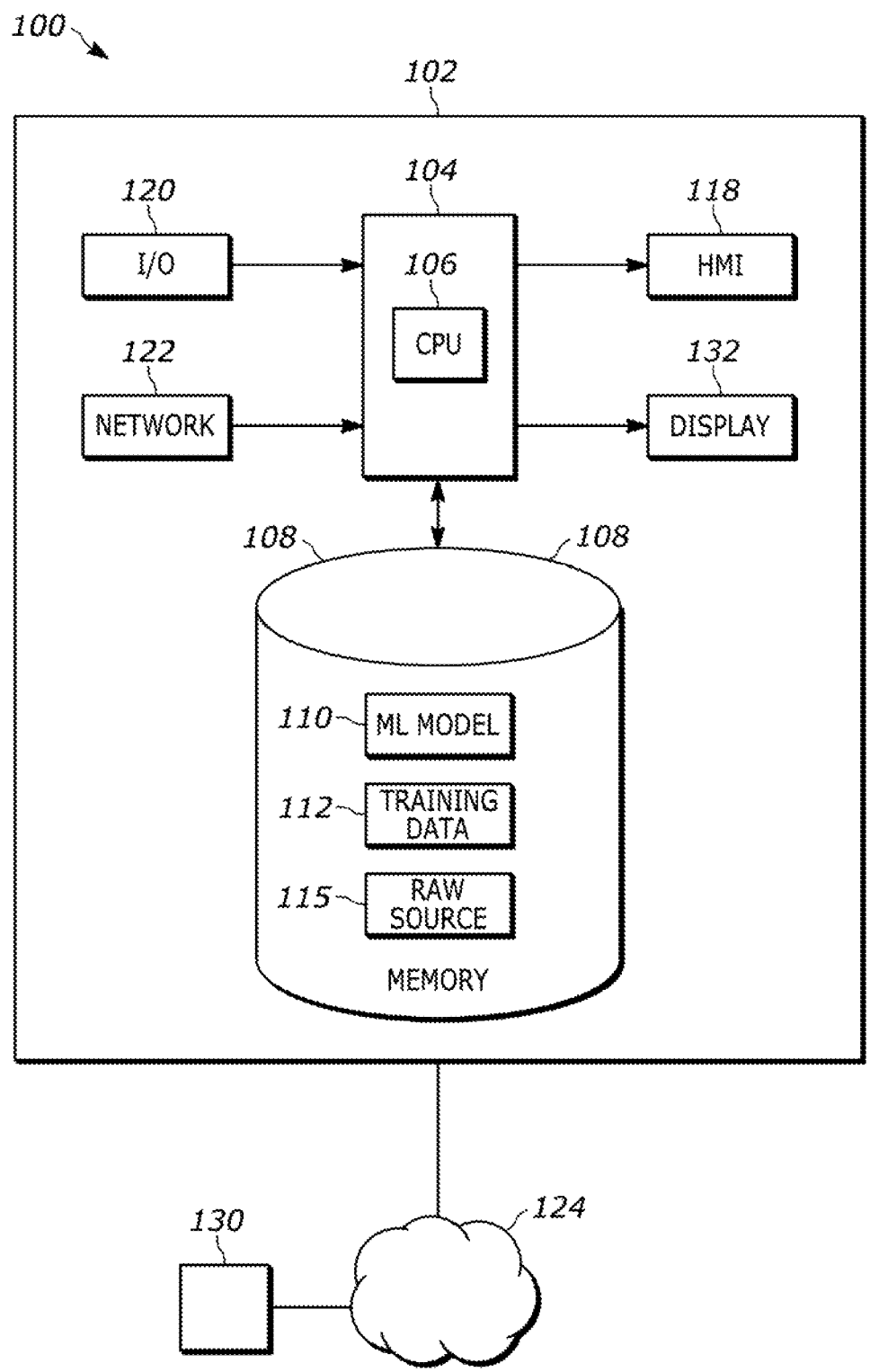
FIG. 1 depicts an exemplary computing system.

As required, detailed embodiments are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present embodiments.

In computing systems, labeled data is generally a sample (e.g., a digital image) that has been tagged with one or more labels. Labeling typically takes a set of unlabeled data and augments each piece of that unlabeled data with meaningful tags that are informative. For instance, a label might be used to: (1) indicate whether an image includes a given object (e.g., a dog or a cat); (2) recognize a spoken word within an audio recording; or, (3) recognize a shape within an x-ray image is indicative of a tumor.

Labels used in various computing systems can be obtained in several different manners. For instance, an annotator (either human or machine) can be tasked with reviewing a given image and applying classifications to any unlabeled data. Such annotation may include labeling whether a given picture includes a specific object (e.g., a dog or cat). The annotator may also be tasked with assigning one or more labels to a sample, according to a pre-defined set of allowed labels. This process of labeling may require significant resources and time and can be a limiting factor on the performance of automated machine learning systems (e.g., convolutional neural network (CNN) or other type of deep neural network (DNN)).

With respect to labeled datasets, it is understood that the annotation process may include labeling "noise" that is an error occurring during the labeling process. Mis-labelling may occur for various reasons. For instance, the available information may be insufficient to perform reliable labelling (e.g., the image may be of poor quality resulting in a dog being labeled as a cat). Alternatively, the annotator may make a mistake during the labelling process. Another source of classification error (i.e., noise) may occur due to the subjectivity of the dataset. For instance, two experts may review an x-ray image and come to differing opinions or results.

Labeling noise may also affect the reliability and performance of machine learning systems that will be trained on that labeled data. As a result, minimizing the effect of possible errors in the annotation is an important step towards increasing the reliability and performance of systems relying on machine learning models.

Additionally, it is contemplated that previously annotated datasets may be re-used to aid the annotation of a new data set. Such reuse generally requires the adaptation of a machine learning system trained on a pre-existing data set (i.e., source dataset) to the new unlabeled dataset (i.e., target dataset).

It is also contemplated that a system and method may be used to select samples to be labeled in an active labeling fashion from an unlabeled dataset (i.e., target dataset) to use in a deep-learning or machine learning system. Such a system and method may be accomplished under labeling budget constraints with the assumption of noise label from the annotator (noisy oracles). A pre-existent labeled dataset (i.e., source dataset) may already be developed from possibly different applications (where noisy labels can also be present). The existence and use of the source dataset may allow for a warm-start of the active learning process and the source dataset may also provide improved classifier performance regarding the number of queries (labeling budget).

Aside from misclassification, it is also understood that the inputs applied at test time may differ from the training dataset, resulting in the machine learning model not performing as desired. For instance, autonomous vehicles generally attempt to segment the digital images captured by the car's camera system to interpret oncoming objects (i.e., buildings, trees, other cars, pedestrians, and traffic lights). A given trained dataset may have been developed and annotated based on images around a given city (e.g., New York City). Based on the trained dataset, the machine learning model may operate as desired in the city used for training. However, the same trained dataset may not operate as desired if the autonomous vehicle is driven in a foreign city (e.g., Paris) because the dataset might not be able to recognize that traffic lights look different, the style of cars look different, and the streets are designed differently. Stated differently, the machine learning model might not be able to operate as desired because the domain of the input data changed while the task domain (the labels) remained the same.

It is contemplated the machine learning model may be operable to overcome misclassifications resulting from domain changes by incorporating a domain adaptation training model where a source distribution may be used on a different (but related) target distribution. Domain adaptation may use labeled data in one or more source domains to solve new tasks in a target domain. The level of relatedness between the source and target domains typically may determine the success of the adaptation.

It is also contemplated that the disclosed system and method may leverage known techniques from domain adaptation, active learning, and robust deep learning. Domain adaptation, through adversarial learning, may be used to effectively transfer information from the source dataset to the target dataset using a pre-trained classifier that may warm-start the labeling process. Active learning, (i.e., maximum entropy-based heuristics and batch active learning) may be used to quickly achieve classifier performance with a small number of target samples being labeled. Robust deep learning may be achieved using an additional dense linear layer at the end of the softmax to perform labeled denoising. It is contemplated that the robust deep learning may be applied while the deep-learning algorithm is being trained. A scheduler may also be used to control the duration and importance of the warm-start.

FIG. 1 illustrates an exemplary system 100 that may be used to perform robust active learning on datasets with noisy labels and domain adaptation. The system 100 may include at least one computing devices 102. The computing system 102 may include at least one processor 104 that is operatively connected to a memory unit 108. The processor 104 may be one or more integrated circuits that implement the functionality of a central processing unit (CPU) 106. The CPU 106 may be a commercially available processing unit that implements an instruction stet such as one of the x86, ARM, Power, or MIPS instruction set families.

During operation, the CPU 106 may execute stored program instructions that are retrieved from the memory unit 108. The stored program instructions may include software that controls operation of the CPU 106 to perform the operation described herein. In some examples, the processor 104 may be a system on a chip (SoC) that integrates functionality of the CPU 106, the memory unit 108, a network interface, and input/output interfaces into a single integrated device. The computing system 102 may implement an operating system for managing various aspects of the operation.

The memory unit 108 may include volatile memory and non-volatile memory for storing instructions and data. The non-volatile memory may include solid-state memories, such as NAND flash memory, magnetic and optical storage media, or any other suitable data storage device that retains data when the computing system 102 is deactivated or loses electrical power. The volatile memory may include static and dynamic random-access memory (RAM) that stores program instructions and data. For example, the memory unit 108 may store a machine-learning model 110 or algorithm, training dataset 112 for the machine-learning model 110, and/or raw source data 115.

The computing system 102 may include a network interface device 122 that is configured to provide communication with external systems and devices. For example, the network interface device 122 may include a wired and/or wireless Ethernet interface as defined by Institute of Electrical and Electronics Engineers (IEEE) 802.11 family of standards. The network interface device 122 may include a cellular communication interface for communicating with a cellular network (e.g., 3G, 4G, 5G). The network interface device 122 may be further configured to provide a communication interface to an external network 124 or cloud.

The external network 124 may be referred to as the world-wide web or the Internet. The external network 124 may establish a standard communication protocol between computing devices. The external network 124 may allow information and data to be easily exchanged between computing devices and networks. One or more servers 130 may be in communication with the external network 124.

The computing system 102 may include an input/output (I/O) interface 120 that may be configured to provide digital and/or analog inputs and outputs. The I/O interface 120 may include additional serial interfaces for communicating with external devices (e.g., Universal Serial Bus (USB) interface).

The computing system 102 may include a human-machine interface (HMI) device 118 that may include any device that enables the system 100 to receive control input. Examples of input devices may include human interface inputs such as keyboards, mice, touchscreens, voice input devices, and other similar devices. The computing system 102 may include a display device 132. The computing system 102 may include hardware and software for outputting graphics and text information to the display device 132. The display device 132 may include an electronic display screen, projector, printer or other suitable device for displaying information to a user or operator. The computing system 102 may be further configured to allow interaction with remote HMI and remote display devices via the network interface device 122.

The system 100 may be implemented using one or multiple computing systems. While the example depicts a single computing system 102 that implements all of the described features, it is intended that various features and functions may be separated and implemented by multiple computing units in communication with one another. The particular system architecture selected may depend on a variety of factors.

The system 100 may implement a machine-learning algorithm 110 that is configured to analyze the raw source data 115 (or dataset). The raw source data 115 may include raw or unprocessed sensor data that may be representative of an input dataset for a machine-learning system. The raw source data 115 may include video, video segments, images, and raw or partially processed sensor data (e.g., data from digital camera or LiDAR sensor). In some examples, the machine-learning algorithm 110 may be a neural network algorithm (i.e., CNN or DNN) that may be designed to perform a predetermined function.

Figure 2:
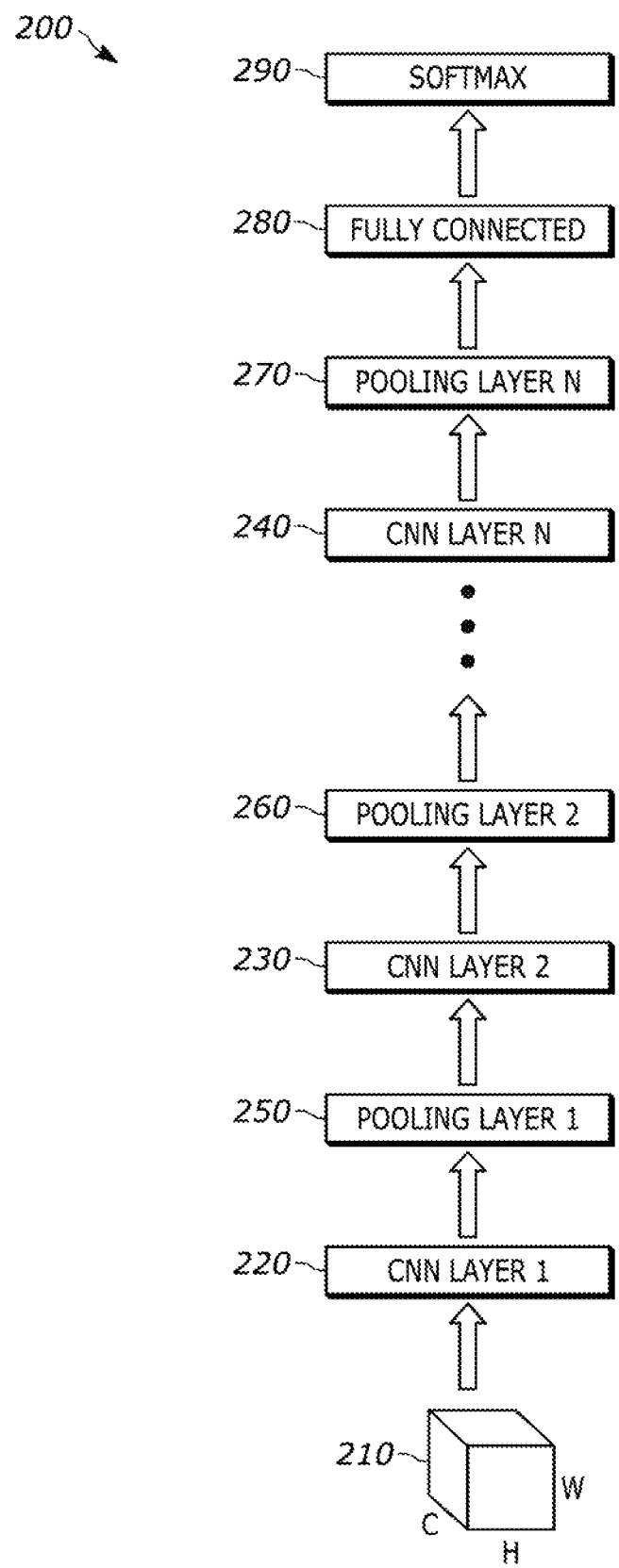
FIG. 2 illustrates an exemplary convolutional neural network.

For instance, FIG. 2 illustrates a non-limiting example of a CNN 200 that includes: an input dataset 210; one or more convolutional layers 220-240; one or more pooling layers 250-270; a fully connected layer 280; and a softmax layer 290.

The input dataset 210 may include raw images, voice data, or text data. Input dataset 210 may also include measurements received from one or more sensors. Alternatively, input dataset 210 may be lightly processed prior to being provided to CNN 200. Convolutional layers 220-240 may also be operable to extract features from the input dataset 210. It is generally understood that convolutional layers 220-240 may be operable to apply filtering operations (e.g., kernels) before passing on the result to another layer of the CNN 200. For instance, for a given dataset (e.g., color image), the convolution layers may execute filtering routines to perform operations such as image identification, edge detection of an image, and image sharpening.

It is also contemplated that the CNN may include one or more pooling layers 250-270 that receive the convoluted data from the respective convolution layers 220-240. Pooling layers 250-270 may include one or more pooling layer units that apply a pooling function to one or more convolution layer outputs computed at different bands using a pooling function. For instance, pooling layer 250 may apply a pooling function to the kernel output received from convolutional layer 220. The pooling function implemented by pooling layers 250-270 may be an average or a maximum function or any other function that aggregates multiple values into a single value.

A fully connected layer 280 may also be operable to learn non-linear combinations for the high-level features in the output data received from the convolutional layers 220-240 and pooling layers 250-270. Lastly, CNN 200 may include a softmax layer 290 that combines the outputs of the fully connected layer 280 using softmax functions. It is contemplated that the neural network algorithm shown by FIG. 2 may be configured for operation within automotive applications to identify objects (e.g., pedestrians) from images provided from a digital camera and/or depth map from a LiDAR sensor.

With reference to FIG. 1, the system 100 may store a training dataset 112 for the machine-learning algorithm 110. The training dataset 112 may represent a set of previously constructed data for training the machine-learning algorithm 110. The training dataset 112 may be used by the machine-learning algorithm 110 to learn weighting factors associated with a neural network algorithm. The training dataset 112 may include a set of source data that has corresponding outcomes or results that the machine-learning algorithm 110 tries to duplicate via the learning process. In this example, the training dataset 112 may include source images and depth maps from various scenarios in which objects (e.g., pedestrians) may be identified.

The machine-learning algorithm 110 may be operated in a learning mode using the training dataset 112 as input. The machine-learning algorithm 110 may be executed over a number of iterations using the data from the training dataset 112. With each iteration, the machine-learning algorithm 110 may update internal weighting factors based on the achieved results. For example, the machine-learning algorithm 110 can compare output results with those included in the training dataset 112. Since the training dataset 112 includes the expected results, the machine-learning algorithm 110 can determine when performance is acceptable. After the machine-learning algorithm 110 achieves a predetermined performance level (e.g., 100% agreement with the outcomes associated with the training dataset 112), the machine-learning algorithm 110 may be executed using data that is not in the training dataset 112. The trained machine-learning algorithm 110 may be applied to new datasets to generate annotated data.

The machine-learning algorithm 110 may also be configured to identify a particular feature in the raw source data 115. The raw source data 115 may include a plurality of instances or input dataset for which annotation results are desired. For example, the machine-learning algorithm 110 may be configured to identify the presence of a pedestrian in images and annotate the occurrences. The machine-learning algorithm 110 may be programmed to process the raw source data 115 to identify the presence of the particular features. The machine-learning algorithm 110 may be configured to identify a feature in the raw source data 115 as a predetermined feature. The raw source data 115 may be derived from a variety of sources. For example, the raw source data 115 may be actual input data collected by a machine-learning system. The raw source data 115 may be machine generated for testing the system. As an example, the raw source data 115 may include raw digital images from a camera.

In the example, the machine-learning algorithm 110 may process raw source data 115 and generate an output. A machine-learning algorithm 110 may generate a confidence level or factor for each output generated. For example, a confidence value that exceeds a predetermined high-confidence threshold may indicate that the machine-learning algorithm 110 is confident that the identified feature corresponds to the particular feature. A confidence value that is less than a low-confidence threshold may indicate that the machine-learning algorithm 110 has some uncertainty that the particular feature is present.

With reference to the disclosed system and method, it is contemplated that a pre-labeled source dataset may be expressed by Equation (1) below:

$$X^s = \{(x_1^s, y_1), \ldots, (x_m^s, y_m)\} \quad \text{Equation (1)}$$

Where, $X^s$ is the pre-labeled source dataset; $x_i^s$ is the $i^{th}$ sample; and $y_i$ is the respective label of the source dataset.

As discussed, the source dataset may be corrupted by label noise. The label noise may be expressed by Equation (2) below:

$$\hat{y} \sim p_s(\hat{y}|y) \quad \text{Equation (2)}$$

Where, $\hat{y}$ denotes the predicated value of y and $p_s$ is the class conditional sample noise. It is contemplated that the probability of label change may depend on the true class y of the sample. It is also contemplated that the noisily labeled source dataset ($Z^s$) can then be expressed by Equation (3) below:

$$Z^s = \{(x_i^s, \hat{y}_i) | (x_i^s, y_i) \sim X^s, \hat{y} \sim p_s(\hat{y}|y)\} \quad \text{Equation (3)}$$

It is contemplated that one of the pre-labeled source dataset ($X^S$) may be sampled and then that sample's label may be corrupted by Equation (2). Equation (4) below may be used to provide robustness to a classifier ($p_s$) over the source dataset:

$$p_s(x, \hat{y})) = \Sigma_y p_s(\hat{y}|y) p_s(x, y) \quad \text{Equation (4)}$$

Based on Equation (4) it is contemplated that by learning the joint (noisy) data distribution $p_s(x, \hat{y})$ and estimate the conditional label noise $p_s(\hat{y}|y)$, the distribution of interest $p_s(x, y)$ may be determined.

The unlabeled target dataset may then be represented using Equation (5) below:

$$\text{Let } X^T = \{(x_1^T, y_1), \ldots, (x_n^T, y_n)\} \qquad \text{Equation (5)}$$

Where $X^T$ is the unlabeled target dataset; $x_i^T$ is the $i^{th}$ sample of the target dataset; and $y_i$ is the respective label of the target dataset. It is contemplated that to apply a classifier ($p_s$) that was used to train the source dataset ($X^S$) to the target dataset ($X^T$) the joint sample/label distributions should be aligned as shown by Equation (6) below:

$$p_s(x^s, y) = p_T(x^T, y) \qquad \text{Equation (6)}$$

This may be achieved by assuming that the source conditional sample noise and the target conditional sample noise are the same as shown by Equation (7) below:

$$p_s(\hat{y}|y) = p_T(\hat{y}|y) \qquad \text{Equation (7)}$$

It is contemplated that the difference between the source dataset and target dataset may be the result of a covariate shift (as shown by Equation (8) below) while the given task may remain the same (as shown by Equation (9) below).

$$p_s(x) \neq p_T(x) \qquad \text{Equation (8)}$$

$$p_s(y|x) = p_T(y|x) \qquad \text{Equation (9)}$$

It is also contemplated that by implementing a domain adaptation algorithm adaptation may be achieved by enforcing similarity between the source input marginal ($p_s(x)$) and the target input marginal ($p_T(x)$) as shown by equation (10) below:

$$p_s(x) = p_T(x) \qquad \text{Equation (10)}$$

It is contemplated that a transformation from source to target may be adversarially learned such that any discriminator would unlikely be operable to distinguish whether a sample originates from the target distribution, or it was modified from the source distribution. This is generally understood as an unsupervised method that does not requires the target-domain labels and can therefore be performed prior to the active learning on the target data set.

To efficiently sample the target dataset within a given sampling budget constraint and based on noisy annotators, the disclosed system and method may operate on a noisy labeled source dataset $X^s$, an unlabeled target dataset $X^T$, and a classifier $f$ parameterized by $\theta$. With these input parameters, the target dataset is sampled by: (1) learning a noise-robust classifier on source data set ($f_s$); (2) adapting the noise-robust classifier trained on the source data set to the target data set using adversarial training to yield a noise-robust classifier that is adapted to the target domain ($f_{s \rightarrow t}$); and (3) using the adapted noise-robust classifier ($f_{s \rightarrow t}$) to warm-start the active learning process to provide training data for target classifier $f_t$.

Figure 3:
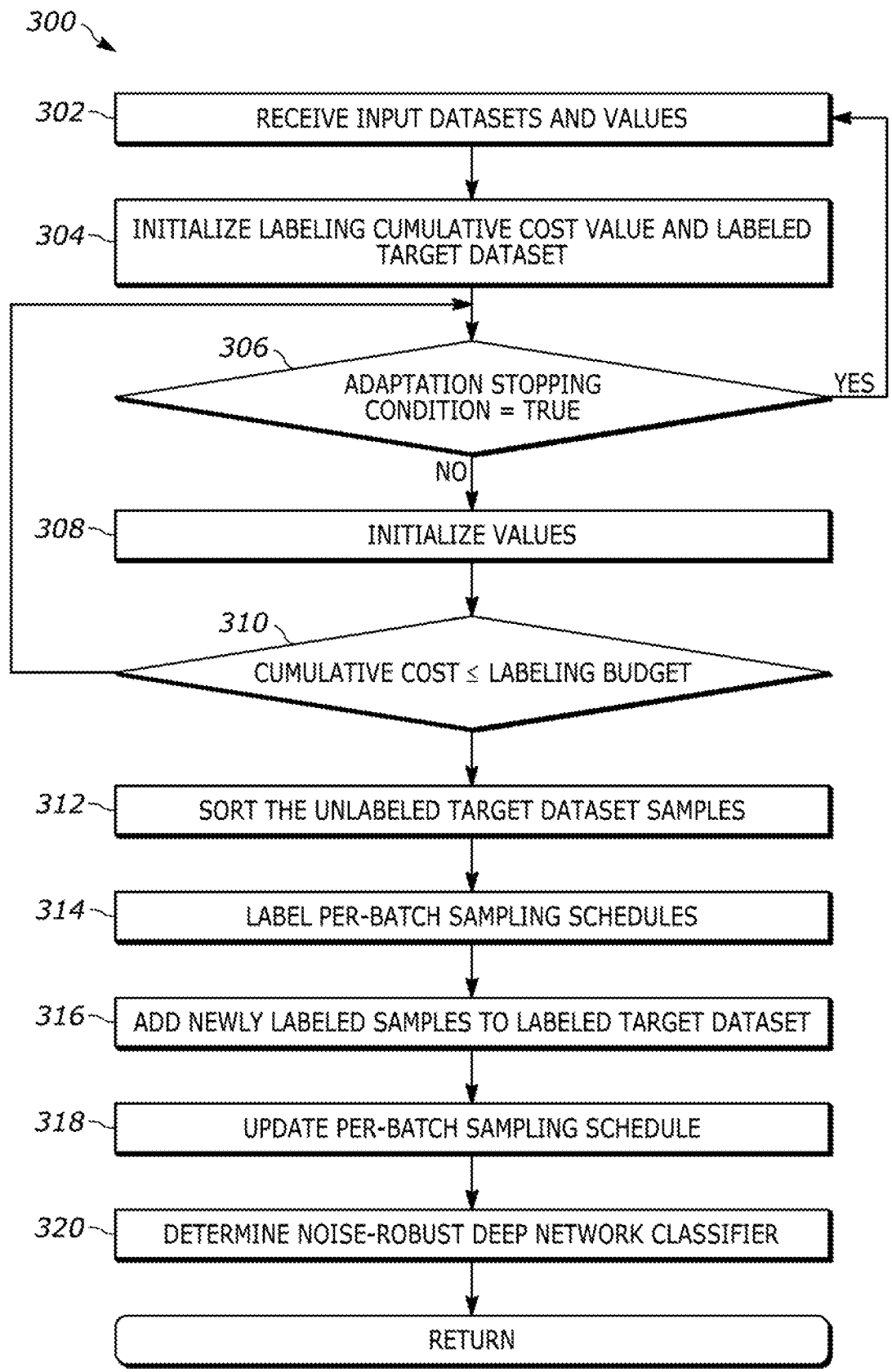
FIG. 3 illustrates flow diagram of the active learning algorithm.

FIG. 3 illustrates a flow diagram 300 illustrating a method that may be employed on system 100 for sampling the target dataset within a given sampling budget constraint and based on noisy annotators. It is contemplated that flow diagram 300 may be executed using a automated machine learning algorithm (e.g., CNN 200).

At Step 302, system 100 may receive one or more inputs. For instance, system 100 may receive the noisily labeled dataset ($X^S$); an unlabeled target dataset ($X^T$); a source classifier ($f_s$) parameterized by ($\theta_s$); an adapted classifier ($f_{s \rightarrow t}$) parameterized by ($\theta_{s \rightarrow t}$); a target classifier ($f_t$) parameterized by ($\theta_t$); an adaptation stopping condition (S) which may be initialized as "FALSE;" a labeling budget value (B); and a per-batch adapted and target sampling schedules ($\lambda_{S \rightarrow T}, \lambda_T$).

It is contemplated that the adaptation stopping condition may be predefined (or initialized) to a "NOT TRUE" or "FALSE" condition. Also, the per-batch sampling schedule may establish the controlling duration or length of the warm-start sequence. While it is contemplated that the per-batch sampling parameters ($\lambda_{S \rightarrow T}, \lambda_T$) may be provided as input values at Step 302, it is also contemplated that the per-batch sampling parameters can be inferred from the target classifier performance on a hold-out dataset where $\lambda_{S \rightarrow T} \gg \lambda_T$ may be used to control the warm-start of the sequence.

Once the inputs are received, flow diagram 300 may proceed to Step 304 where one or more values are initialized. For instance, a labeling cumulative cost (C) value may be initialized to a starting value of zero (0). Also, a labeled target dataset ($X^{T_l}$) may be initialized to an empty or new dataset (e.g., $X^{T_l} = \{\ \}$). Flow diagram 300 may then proceed to Step 306 to evaluate whether the adaptation stopping condition (S) is equal to a FALSE value. If NO, flow diagram 300 proceeds back to Step 302.

If YES, flow diagram 300 proceeds to Step 308 where the source classifier ($f_s$) is initialized from $f_s$ ($\theta_{s \rightarrow t} \leftarrow \theta_s$). Step 308 also will adapt the source classifier $f_{s \rightarrow t}$ to the unlabeled target dataset ($X^T$) based on adversarial training (i.e., adversarial machine learning algorithm) that uses a domain discrimination technique. However, it is contemplated other domain adaptation techniques other than adversarial training may be used at Step 408. For instance, it is contemplated that a reweighting algorithm, iterative algorithm, or hierarchical Bayesian model may be used. Step 408 also updates the parameterized adapted value (i.e., $\theta_{s \rightarrow t}$) and proceeds to Step 410.

Step 310 evaluates whether the cumulative cost (C) value is less-then or equal to the labeling budget value (i.e., C≤B). If NO (i.e., C>B), then flow diagram returns to Step 306. If YES, flow diagram 300 proceeds to Step 312 where an active learning algorithm (i.e., annotator) may operate to sort the unlabeled target dataset ($O_T$) samples using a target classifier ($f_T$)—i.e., noise-robust deep network classifier. Step 312 also uses an active learning algorithm also operate to sort the unlabeled adapted samples ($O_{S \rightarrow T}$) using the adapted classifier ($f_{s \rightarrow T}$). At Step 314, the top target per-batch sampling schedule ($\lambda_T$) samples are labeled using the unlabeled target dataset ($O_T$). Also, the top adapted per-batch sampling schedule ($\lambda_{S \rightarrow T}$) samples are labeled using the unlabeled adapted samples ($O_{S \rightarrow T}$). At Step 316, flow diagram 300 would operate to add the newly labeled samples to the labeled target dataset ($X^{T_l}$). Flow diagram 300 then proceeds to Step 318 where the per-batch sampling schedule ($\lambda_{S \rightarrow T}, \lambda_T$) may also be updated. At step 320, the noise-robust deep network target classifier ($f_T$) may be determined on the labeled target dataset ($X^{T_l}$). It is contemplated that the noise-robust deep target classifier ($f_T$) may be implemented using a final softmax output layer and a fully connected linear layer which operates to handle the noisy labels.

Alternatively, it is contemplated that a batch active learning strategy may be employed instead of the iterative learning approach. For instance, instead of labeling each individual unlabeled target dataset ($X^T$) sample, system 100 may batch the unlabeled target dataset ($X^T$) samples and sort these samples using the active learning approach implemented by Steps 312, 314. The noise-robust deep network target classifier ($f_T$) could then be updated per-batch. It is contemplated that the active learning sampling strategy may be implemented using a maximum entropy-based heuristic to drive the active learning process of the machine learning algorithm. However, it is also contemplated that additional or alternative active learning sampling strategies may be implemented.

Figure 4:
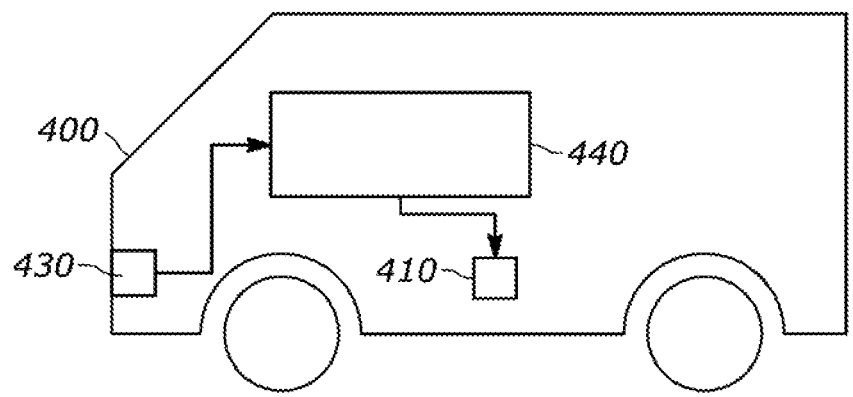
FIG. 4 illustrates a computing system controlling an at least partially autonomous robot.

FIG. 4 illustrates an embodiment in which a computing system 440 may be used to control an at least partially autonomous robot, e.g. an at least partially autonomous vehicle 400. The computing system 440 may be like the system 100 described in FIG. 1. Sensor 430 may comprise one or more video/camera sensors and/or one or more radar sensors and/or one or more ultrasonic sensors and/or one or more LiDAR sensors and/or one or more position sensors (like e.g. GPS). Some or all these sensors are preferable but not necessarily integrated in vehicle 400.

Alternatively, sensor 430 may comprise an information system for determining a state of the actuator system. The sensor 430 may collect sensor data or other information to be used by the computing system 440. One example for such an information system is a weather information system which determines a present or future state of the weather in environment. For example, using input signal x, the classifier may for example detect objects in the vicinity of the at least partially autonomous robot. Output signal y may comprise an information which characterizes where objects are located in the vicinity of the at least partially autonomous robot. Control command A may then be determined in accordance with this information, for example to avoid collisions with said detected objects.

Actuator 410, which may be integrated in vehicle 400, may be given by a brake, a propulsion system, an engine, a drivetrain, or a steering of vehicle 400. Actuator control commands may be determined such that actuator (or actuators) 410 is/are controlled such that vehicle 400 avoids collisions with said detected objects. Detected objects may also be classified according to what the classifier deems them most likely to be, e.g. pedestrians or trees, and actuator control commands A may be determined depending on the classification.

Figure 5:
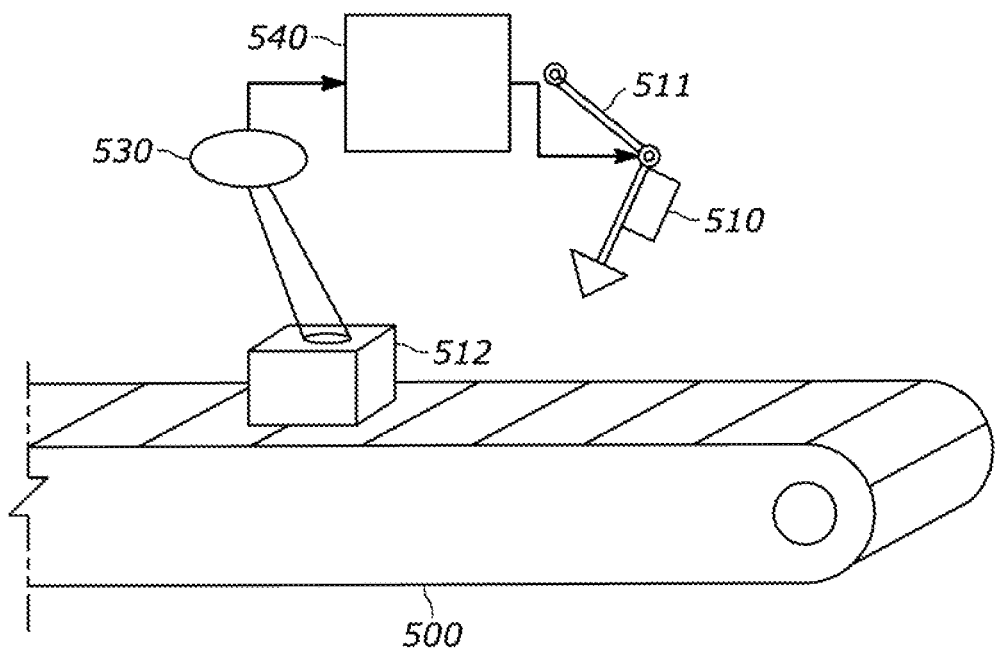
FIG. 5 is an embodiment in which a computer system may be used to control an automated personal assistant.

Shown in FIG. 5 is an embodiment in which computer system 540 is used for controlling an automated personal assistant 550. Sensor 530 may be an optic sensor, e.g. for receiving video images of a gestures of user 549. Alternatively, sensor 530 may also be an audio sensor e.g. for receiving a voice command of user 549.

Control system 540 then determines actuator control commands A for controlling the automated personal assistant 550. The actuator control commands A are determined in accordance with sensor signal S of sensor 530. Sensor signal S is transmitted to the control system 540. For example, classifier may be configured to e.g. carry out a gesture recognition algorithm to identify a gesture made by user 549. Control system 540 may then determine an actuator control command A for transmission to the automated personal assistant 550. It then transmits said actuator control command A to the automated personal assistant 550.

For example, actuator control command A may be determined in accordance with the identified user gesture recognized by classifier. It may then comprise information that causes the automated personal assistant 550 to retrieve information from a database and output this retrieved information in a form suitable for reception by user 549.

In further embodiments, it may be envisioned that instead of the automated personal assistant 550, control system 540 controls a domestic appliance (not shown) controlled in accordance with the identified user gesture. The domestic appliance may be a washing machine, a stove, an oven, a microwave or a dishwasher.

Figure 6:
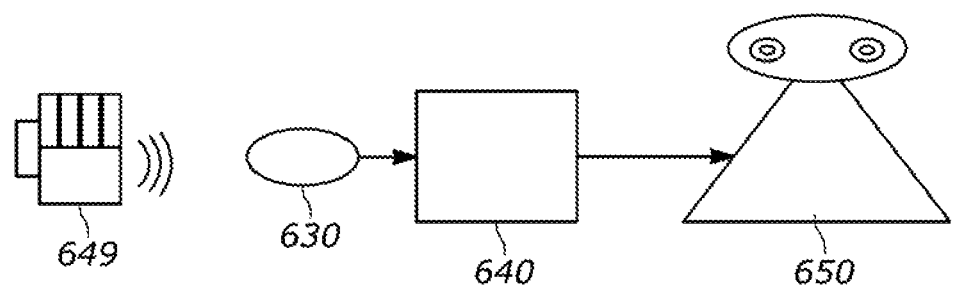
FIG. 6 is an embodiment in which the computing system may be used to control an access control system.

Shown in FIG. 6 is an embodiment in which computing system controls an access control system 600. Access control system may be designed to physically control access. It may, for example, comprise a door 601. Sensor 630 is configured to detect a scene that is relevant for deciding whether access is to be granted or not. The sensor 630 may collect image data or video data related to the scene. It may for example be an optical sensor for providing image or video data, for detecting a person's face. Classifier may be configured to interpret this image or video data e.g. by matching identities with known people stored in a database, thereby determining an identity of the person. Actuator control signal A may then be determined depending on the interpretation of classifier, e.g. in accordance with the determined identity. Actuator 610 may be a lock which grants access or not depending on actuator control signal A. A non-physical, logical access control is also possible.

Figure 7:
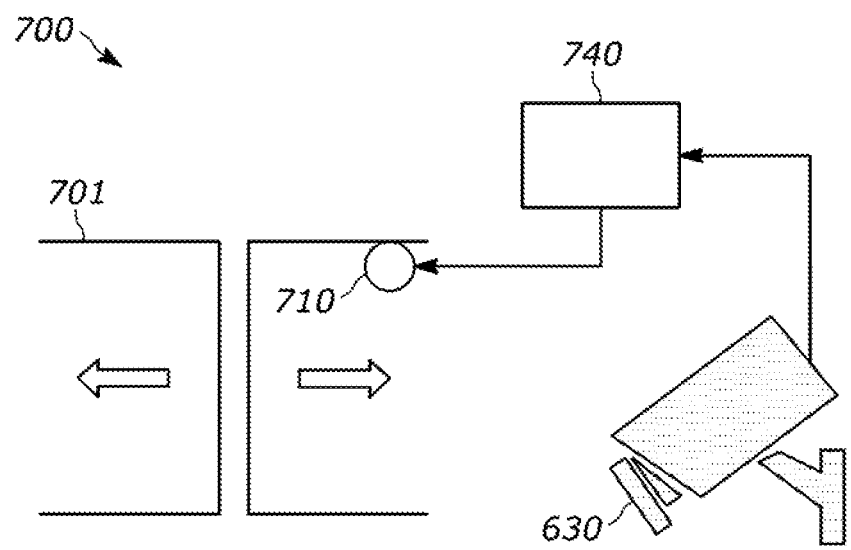
FIG. 7 is an embodiment in which the computing system may be used to control a surveillance system.

Shown in FIG. 7 is an embodiment in which computing system 740 controls a surveillance system 700. This embodiment is largely identical to the embodiment shown in FIG. 5. Therefore, only the differing aspects will be described in detail. Sensor 730 is configured to detect a scene that is under surveillance. The sensor 730 may collect image data or video data related to the scene. The computing system does not necessarily control an actuator 710, but a display 710a. For example, the machine learning system may determine a classification of a scene, e.g. whether the scene detected by optical sensor 730 is suspicious. Actuator control signal A which is transmitted to the display 710a may then e.g. be configured to cause the display 710a to adjust the displayed content dependent on the determined classification, e.g. to highlight an object that is deemed suspicious by machine learning system.

Figure 8:
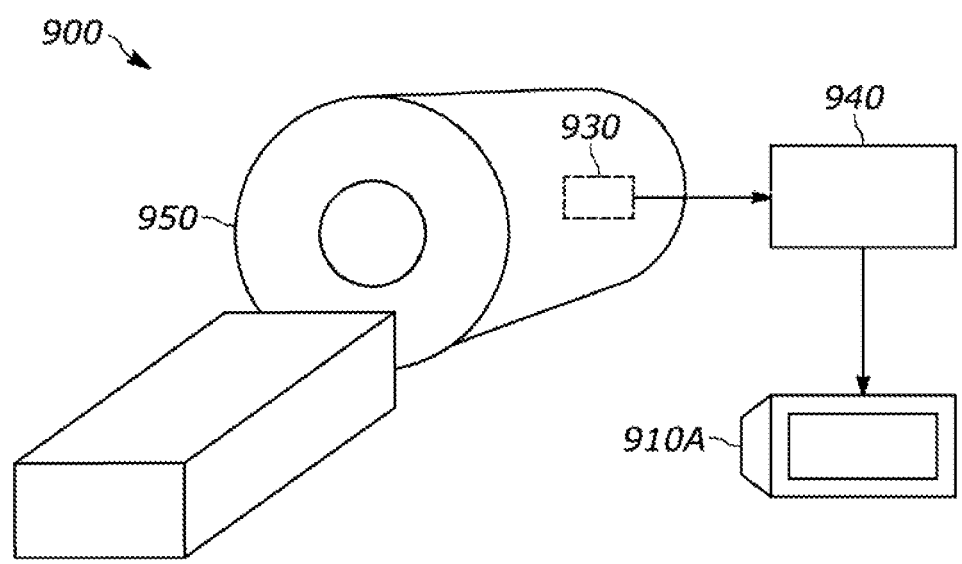
FIG. 8 is an embodiment in which the computing system may be used to control an imaging system.

Shown in FIG. 8 is an embodiment of a computing system 840 for controlling an imaging system 800, for example an MRI apparatus, x-ray imaging apparatus or ultrasonic imaging apparatus. Sensor 830 may, for example, be an imaging sensor. Machine learning system may then determine a classification of all or part of the sensed image. The computing system 840 may collect data related to the images affiliated with the x-ray imaging or ultrasonic imaging. Actuator control signal A may then be chosen in accordance with this classification, thereby controlling display 810a. For example, machine learning system may interpret a region of the sensed image to be potentially anomalous. In this case, actuator control signal A may be determined to cause display 810a to display the imaging and highlighting the potentially anomalous region.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data, logic, and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method that includes an active learning algorithm, comprising:
    receiving a noisily labeled source dataset;
    applying a robust deep learning algorithm to identify a source classifier for the noisily labeled source dataset;
    determining an adapted classifier using a domain discrimination algorithm that operates on the source classifier; and
    assigning a label to one or more samples within an unlabeled target dataset based on the active learning algorithm that operably uses a target classifier and the adapted classifier wherein the active learning algorithm is designed using a maximum entropy-based heuristic algorithm.

2. The method of claim 1, wherein the domain discrimination algorithm is designed as an adversarial network.

3. The method of claim 1, further comprising: warm-starting the active learning algorithm using the adapted classifier, wherein the active learning algorithm is operable to provide training data for the target classifier.

4. The method of claim 3, wherein a scheduler controls a duration for warm-starting the active learning algorithm.

5. The method of claim 1, wherein the robust deep learning algorithm includes a softmax layer followed by a dense linear layer operable to perform denoising of the noisily labeled source dataset.

6. The method of claim 1, wherein the active learning algorithm is designed using a batch active learning algorithm.

7. The method of claim 6, wherein the target classifier is updated per-batch.

8. A method that includes an active learning algorithm, comprising:
    receiving a noisily labeled source dataset;
    applying a robust deep learning algorithm to identify a source classifier for the noisily labeled source dataset;
    determining an adapted classifier using an adversarial domain adaptation machine learning algorithm that operates on the source classifier; and
    assigning a label to one or more samples within an unlabeled target dataset based on the active learning algorithm that operably uses a target classifier and the adapted classifier.

9. The method of claim 8, further comprising: warm-starting the active learning algorithm using the adapted classifier, wherein the active learning algorithm is operable to provide training data for the target classifier.

10. The method of claim 9, wherein a scheduler controls a duration for warm-starting the active learning algorithm.

11. The method of claim 8, wherein the robust deep learning algorithm includes a softmax layer followed by a dense linear layer operable to perform denoising of the noisily labeled source dataset.

12. A system operable to employ an active learning algorithm, comprising:
    a processor operable to:
    receive a noisily labeled source dataset;
    apply a robust deep learning algorithm to identify a source classifier for the noisily labeled source dataset;
    determine an adapted classifier using an domain discrimination machine learning algorithm that operates on the source classifier; and
    assign a label to one or more samples within an unlabeled target dataset based on the active learning algorithm that operably uses a target classifier and the adapted classifier wherein the active learning algorithm is designed using a maximum entropy-based heuristic algorithm.

13. The system of claim 12, wherein the domain discrimination machine learning algorithm is designed using an adversarial network.

14. The system of claim 12, wherein the processor is further operable to: warm-start the active learning algorithm using the adapted classifier, wherein the active learning algorithm is operable to provide training data for the target classifier.

15. The system of claim 14, wherein the system further comprises a scheduler that controls a duration to warm-start the active learning algorithm.

16. The system of claim 12, wherein the robust deep learning algorithm includes a softmax layer followed by a dense linear layer operable to perform denoising of the noisily labeled source dataset.

17. The system of claim 12, wherein the active learning algorithm is designed using a batch active learning algorithm.

18. The system of claim 17, wherein the target classifier is updated per-batch.

* * * * *